United States Patent [19]

Albert

[11] Patent Number: 4,797,074

[45] Date of Patent: Jan. 10, 1989

[54] GOVERNOR DEVICE

[75] Inventor: Gregory P. Albert, Waverly, N.Y.

[73] Assignee: Ingersoll-Rand Company, Woodcliff Lake, N.J.

[21] Appl. No.: 67,994

[22] Filed: Jun. 29, 1987

[51] Int. Cl.$^4$ .................. F01C 21/12; G05D 13/10

[52] U.S. Cl. ............................ 418/41; 418/43; 137/56

[58] Field of Search ............ 418/40, 41, 42, 43, 418/44; 137/56, 57; 415/25, 36; 173/12

[56] References Cited

U.S. PATENT DOCUMENTS

| | | | |
|---|---|---|---|
| 2,402,972 | 7/1946 | Mitchell | 418/43 X |
| 2,504,441 | 8/1950 | Mitchell | 418/42 |
| 3,071,115 | 1/1963 | Schott | 418/42 |
| 3,257,913 | 6/1966 | Broom et al. | 418/43 |
| 3,427,980 | 2/1969 | Jubb et al. | 418/43 X |
| 4,090,821 | 5/1978 | Barrows et al. | 418/43 X |

FOREIGN PATENT DOCUMENTS

| | | | |
|---|---|---|---|
| 284731 | 12/1970 | U.S.S.R. | 173/12 |
| 558178 | 12/1943 | United Kingdom | 418/43 |

Primary Examiner—Leonard E. Smith
Attorney, Agent, or Firm—Walter C. Vliet

[57] ABSTRACT

Disclosed is a speed controller of the ball cone type having a unique conical head which serves as a face seal valve and further encloses seals and protects the governor against entry of particulate matter.

9 Claims, 2 Drawing Sheets

GOVERNOR DEVICE

In the past, centrifugal governors have been extensively used to control the speed of rotary, pneumatic, or pressure fluid driven high speed grinders and other tools.

Typically, these flyweight, ball and ring type controlled devices have been revolved about a pivot point or displaced radially as the speed of the grinder increased. The movement of the flyweights working against a spring as a speed reference force was converted into a movement of a valve means to modulate the supply of pressure fluid. Numerous ingenious devices have been developed to accomplish what appears to be this relatively simple task.

The proposed ball/cone type speed controller according to the present invention basically solves the problems of the ring/ball and flyweight type designs and provides a highly reliable means of speed control at relatively low cost.

SUMMARY OF THE INVENTION

The present invention utilizes a revolving cone with a substantially flattened end which rotates with or in proportion to the speed of the grinder motor. The object of this invention, therefore, is to provide a simple, economical, reliable, controller for rotary devices driven by pressure fluid. A further object of this invention is to teach a device which has a minimum of moving parts. It is still a further object of this invention to teach a governor device or speed controller without mechanical linkage or independent valving mechanism and that is not affected by dirt or moisture in the air.

The controller has a capability of speed control satisfactory for normal grinder usage and other applications where ultra precise speed control is not required. In general, these and other objects are achieved in a governor device comprising: a motor speed controller for pressure fluid operated motors comprising: a pressure fluid motor; a controller body rotating in proportion to the speed of the motor; a plurality of balls symmetrically disposed on the controller body for radial displacement upon increase of rotational speed, a cone member surrounding the controller body and mounted thereon for resiliently resisted axial extension in response to the radial displacement of the balls; and a face seal means on the cone member for cooperation with a face seat means for controlling air flow to the pressure fluid motor in response to motor speed.

DESCRIPTION OF THE PREFERRED EMBODIMENT

Figure 1:
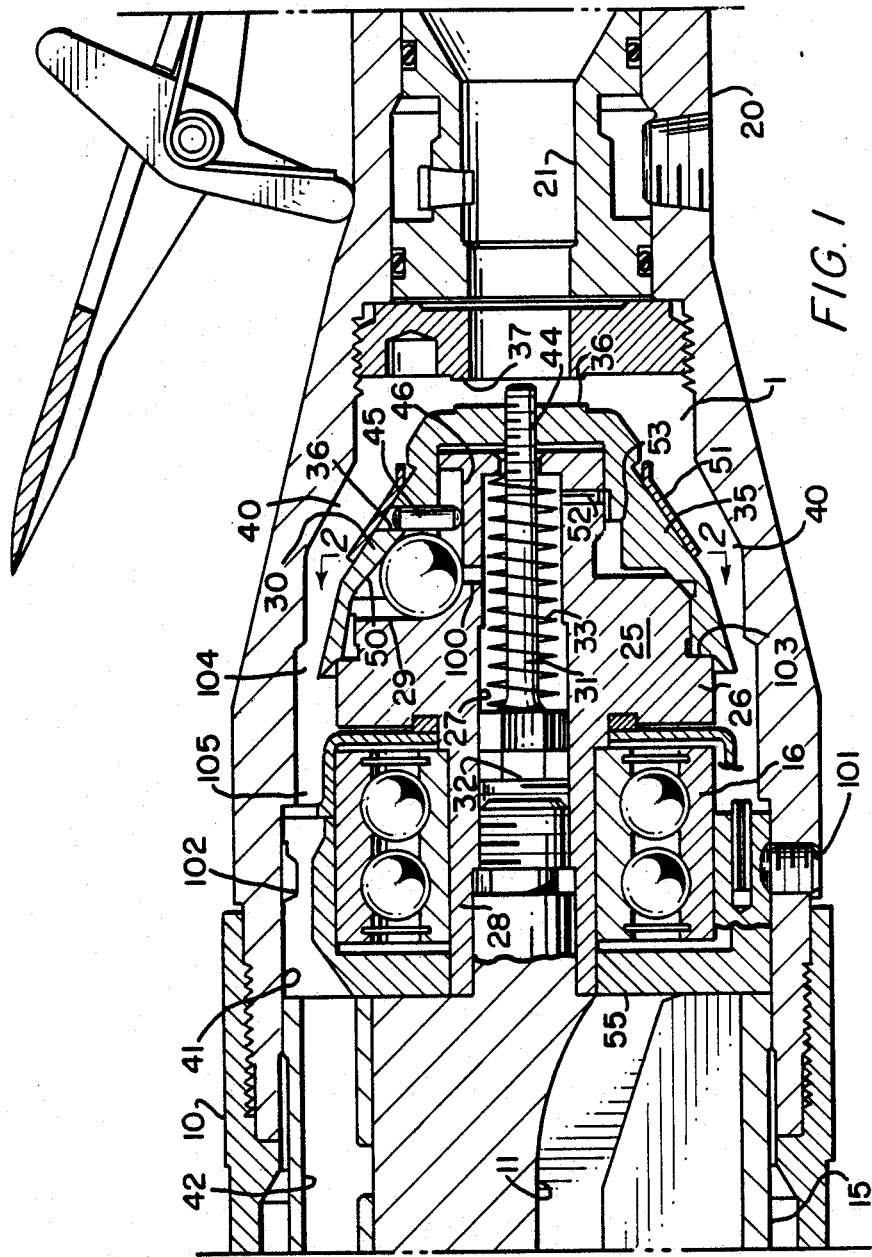
FIG. 1 is a side elevation of a rotary grinder having a speed controller according to this invention.

A portion of a rotary high speed grinder commonly referred to as a horizontal grinder is generally designated as reference numeral 1. The grinder is provided with a housing 10, a handle 20 (partly shown), and a grinding wheel (not shown). The housing contains a rotary pressure fluid motor 15 (partly shown) which has its power output on a spindle which is adapted at its outer end to receive the grinding wheel.

In the device as shown in FIG. 1, air is supplied to the grinder through a passageway 21, formed in the handle 20. The on/off flow of air is controlled by a lever operated valve (not shown). The supply of air to the motor is controlled in flow as a function of rotor 11 speed by a cone and ball centrifugal controller 25. The centrifugal governor or controller 25, according to the present invention is comprised, in the following preferred embodiment, of a controller body 26, roughly in the shape of a solid cone having a central bore 27, running from its apex to it base. The controller body 26, has an extended base in the form of a hollow shaft 28, which supports the controller body 26, for rotation with the rotor 11 of motor 15, in bearing 16. The controller body 26, has formed therein six accurate formed pockets 29, which receive and position a number of controller balls 30. The central bore 27 is of hexagonal cross section and receives therein an adjusting bolt or controller stem 31 having a hex head 32, found thereon. The hex head 32, cooperates with the hexagonal bore 27, to prevent rotation of the controller stem while allowing its axial translation within the bore. The axial translation to the right as shown in FIG. 1 is resisted by controller spring 33.

Surrounding the controller body towards the air inlet 21, is a cup like, or cone having a substantially flattened tip, controller cap 35. The substantially flattened tip of the cap 35 forms a face annulus 36, which cooperates with controller seat 37, to restrict air inflow to the circumferential air passages 40, which in turn direct air or pressure fluid to the motor 15, by way of distributor passage 41, and plenum 42.

The controller cap 35 is connected by means of threaded connection 44, to controller stem 31. This permits adjustment of the controller spring 33 preload. Once the appropriate preload is set, the cap 35 is secured rotationally relative to controller body by pin stakes 45, which cooperate with holes 36, provided on the cap 35, and slots or notches 46, in the body 26, to prevent further rotation of the cap 35, relative to the controller stem 31. This in combination with the number of governor balls selected sets the controller speed. Once set, the pin stakes 45, are inserted and secured by means of cover 51. The cover is crimped in place to prevent disassembly and unauthorized service of the assembled controller.

Figure 2:
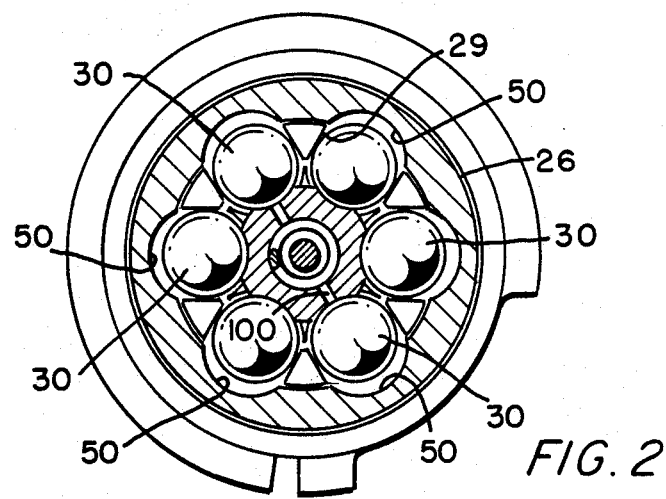
FIG. 2 is a plan section taken through a controller at section 2—2 of FIG. 1.

The governor balls 30, cooperate with cam surface 50, provided in the cone 35, to provide the force necessary on rotation to displace the cone in an axial direction to the right as viewed in FIG. 1. FIG. 2 shows the disposition of six balls 30, in the pockets 29.

It should be understood that two, three, four or six balls may be used and result in a dynamically balanced controller. The number of balls effect the displacement force and in combination with the controller spring 33, set the controlled speed with appropriately adjusted preload.

Bleed holes (100) are provided for dynamic stabilization to prevent hunting and instability due to internal volume changes during operation. In other words, to reduce the air spring effect.

Figure 3:
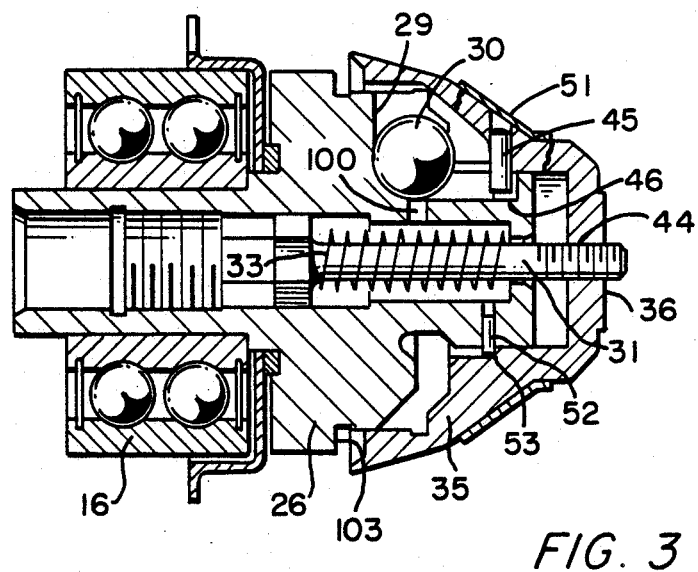
FIG. 3 is a side elevation of the controller of FIG. 1 in its overtravel/lockout position.

FIG. 3, shows the controller in its overtravel/lockout position. In this position lock pin 52, extends radially outward by centrifugal force to engage a ridge 53, in the cap 35. Once this occurs on overtravel the controller assembly cannot be disassembled and repaired as it is a sealed, crimped, unit. However, it can be reset from the lockout position by applying extension force to the cap to receive the load on the lock pin and then tapping on the side opposite the pin to force the pin back into its hole (below the ridge on the cap). Once this is done, the controller is reset, reassembled and tested. This is a safety feature of the present device.

In operation, an additional failsafe design concept involves the support of rotor shaft 5, within the controller body shaft 28 and bearing 16. Should the speed controller be accidently left out or intentionally removed during assembly, loss of radial support of the rear rotor shaft 5, would permit the rotor to cock and bind between motor end plates 55 thereby preventing the rotor from accelerating to unsafe speeds. Retaining screws 101 function as a safeguard to assure proper positioning of the controller cap with the nozzle face. Should someone operate the tool without the housing pieces properly clamped and positioned, the controller nozzle gap would be larger than designed (and the tool could be operated this way) and as the controller cap travel is limited, it may be insufficient to control in the oversize nozzle gap. The screws 101 assure the nozzle gap is as designed whether the housing pieces are properly clamped or not. If the screws are left out then supply air will blow out of the screw holes—circumferential channel 102 about the end plate provides a locking groove for the screws as well as an air channel to distribute supply air to the screw holes.

The controller unit is virtually sealed against contamination when operating at speeds up to approximately 70% of the designed free speed because of rim seal 103. At speeds above the 70% point up to the controlled free speed RPM the controller cap is displaced axially to the right to regulate the air flow and the rim seal 103 is separated. To prevent contamination from entering the controller, the cap 35 and housing 20 are constructed to form a nozzle 104 at the tip of the cap thereby accelerating the air and contaminants beyond the separated rim seal area. The particles pass into the annular region 105 about the rear end plate and are prevented from returning to the separated seal area because of the high air flow velocity created by the nozzle 104. The centrifugal action of the controller cap acting against the particles tends to keep the contaminants against the housing 20. Without the rim seal 103, nozzle 104, annulus 105, and centrifugal action, particles could enter the controller and contaminate the inside.

Having described my invention in terms of a preferred embodiment, numerous modifications may occur to those skilled in the art and I therefor do not wish to be limited in the scope of my invention except as claimed.

I claim:

1. A motor speed controller for pressure fluid operated motors comprising:
    a pressure fluid motor;
    a controller body rotating in proportion to the speed of said motor;
    a plurality of balls disposed on said controller body for radial displacement upon increase of rotation speed;
    a control means surrounding said controller body and mounted thereon for resilient resisted axial extension in response to the radial displacement of said balls; and
    a face seal means on said control means for cooperation with a face seat means for controlling air flow to said pressure fluid motor in response to motor speed;
    said control means further comprises:
    a hollow cone which overlays said controller body, and;
    said control means forms a sealed cover over said controller body at low speed.

2. A motor speed controller according to claim 1 wherein:
    said controller body being comprised of a cone having ball pockets formed in its peripheral surface.

3. A motor speed controller according to claim 1 wherein:
    said control means forms a deflector nozzle to deflect contaminant particles past said controller during operation.

4. A motor speed controller according to claim 3 wherein:
    said control means form a sealed cover over said controller body up to approximately 70 percent of the normal maximum operating speed and an effective annular nozzle to accelerate particles past its open seal at operating speed.

5. A motor speed controller according to claim 1 wherein:
    said controller body is provided with a rim seal which cooperates with said control means to prevent contaminants from entering said controller body.

6. A motor speed controller according to claim 1 wherein:
    said controller body is provided with at least one radially displaceable pin as a means for locking out said speed controller on overtravel.

7. A motor speed controller according to claim 6 wherein:
    said pin intercepts a ridge in said control means to hold said control means in its overtravel position.

8. A motor speed controller according to claim 1 wherein:
    said motor speed controller is mounted in bearing means which also provide bearing means for said pressure fluid motor whereby removal of said controller will disable said bearing means for said motor means as a safety device.

9. A motor speed controller for a pressure fluid operated grinder comprising:
    a motor speed controller for pressure fluid operated motors;
    a pressure fluid motor;
    a controller body rotating in proportion to the speed of said motor;
    a plurality of balls disposed on said controller body for radial displacement upon increase of rotation speed;
    a control means surrounding said controller body and mounted thereon for resilient resisted axial extension in response to the radial displacement of said balls;
    a face seal means on said control means for cooperation with a face seal means for controlling air flow to said pressure fluid motor in response to motor speed;
    said controller body being further comprised of a cone having ball pockets formed in its peripheral surface;
    said control means further comprising a hollow cone which overlays said controller body;

said control means forming a deflector nozzle to deflect contaminant particles past said controller during operation; and said control means forming a sealed cover over said controller body up to approximately 70 percent of the normal maximum operating speed and an effective annular nozzle to accelerate particles past its open seal at operating speed.

* * * * *